(12) United States Patent
Palmieri et al.

(10) Patent No.: US 7,708,196 B2
(45) Date of Patent: May 4, 2010

(54) MODULAR WEB-BASED ASP APPLICATION FOR MULTIPLE PRODUCTS

(75) Inventors: David Palmieri, Short Hills, NJ (US);
David Ingerman, Short Hills, NJ (US);
Amy Hayenhjelm, Livingston, NJ (US);
Peter F. Kinkel, Staten Island, NY (US);
Robert Tam, Staten Island, NY (US);
Keith E Gastauer, Hoboken, NJ (US);
Ruth J Davis, Montclair, NJ (US);
Angelo Sirigos, Bellmore, NY (US);
Curtis W Harris, Half Moon Bay, CA (US); Joseph Davidchik, Alameda, CA (US); Michele Iacavone, Burlingame, CA (US); Liz Templin, Warren, NJ (US); Jesus Urriola, Kearny, NJ (US);
Omcar S Paradkar, Santa Clar, CA (US); Busse B Benjamin, San Francisco, CA (US); Jeffrey L Kaufman, Foster City, CA (US); Prashant Tyagi, Redwood City, CA (US); Angel Gutierrez, San Mateo, CA (US)

(73) Assignee: Dun and Bradstreet Corporation, Short Hills, NJ (US)

( * ) Notice: Subject to any disclaimer, the term of this patent is extended or adjusted under 35 U.S.C. 154(b) by 622 days.

(21) Appl. No.: 11/543,486

(22) Filed: Oct. 5, 2006

(65) Prior Publication Data

US 2007/0225992 A1    Sep. 27, 2007

Related U.S. Application Data

(60) Provisional application No. 60/817,936, filed on Jun. 30, 2006, provisional application No. 60/723,854, filed on Oct. 5, 2005.

(51) Int. Cl.
*G06K 5/00*    (2006.01)
(52) U.S. Cl. .............. 235/380; 235/487; 235/382
(58) Field of Classification Search ............ 235/380, 235/375, 487, 382; 705/38, 36
See application file for complete search history.

(56) References Cited

U.S. PATENT DOCUMENTS

| | | | | |
|---|---|---|---|---|
| 6,347,307 | B1 | 2/2002 | Sandhu et al. | 705/35 |
| 7,428,495 | B2 * | 9/2008 | Dhar et al. | 705/8 |
| 2003/0074277 | A1 | 4/2003 | Foutz | 705/26 |
| 2004/0162742 | A1 | 8/2004 | Stoker et al. | 705/7 |
| 2005/0015619 | A1 | 1/2005 | Lee | 713/201 |
| 2005/0033697 | A1* | 2/2005 | Mundell et al. | 705/51 |
| 2005/0119961 | A1 | 6/2005 | Tanzillo et al. | 705/36 |
| 2006/0294197 | A1 | 12/2006 | Mital et al. | 709/217 |

* cited by examiner

*Primary Examiner*—Edwyn Labaze
(74) *Attorney, Agent, or Firm*—Ohlandt, Greeley, Ruggiero & Perle, L.L.P.

(57) ABSTRACT

A method of providing business information data to a user, including allowing the user unlimited access to interactive, customizable modular applications through a single platform. The applications interface with a database to provide real-time business information data to the user, the business information data relating to an entity and being based on a unique corporate identification number associated with the entity.

20 Claims, 10 Drawing Sheets

DNBi®
D&B Power Freedom Confidence

Premier User Admin    My Profile | Help | Sign Out

| Dashboard | Companies | News & Alerts | Account Manager | Decision Maker | Admin |

Search [Enter Company Name, ID or D-U-N-S #] [Enter City] [Enter State ▼] [Search]    ⊙ More Options

Welcome to DNBi!
○ Help

Top 10 Companies by Best Commercial Credit Score Percentile

|   | Company Name | D-U-N-S Number | Paydex | Commercial Credit Score Percentile | D & B Alerts |
|---|---|---|---|---|---|
| 1 | EXXON MOBL CORPORATION | 00-121-3214 | 72 | 400 | 4 ⚠ |
| 2 | AUTOMATIC DATA PROCESSING, INC | 00-191-5172 | 74 | 400 | 1 ⚠ |
| 3 | MID-SOUTH FEEDS, INC | 00-405-1694 | 80 | 400 | 1 ⚠ |
| 4 | WELLS FARGO & COMPANY | 00-696-2435 | ▲73 | 400 | 1 ⚠ |
| 5 | AUTOMATIC DATA PROCESSING, INC | 01-632-9067 | 80 | 100 | |
| 6 | ADOBE SYSTEMS INCORPORATED | 02-300-0024 | UN | 400 | 2 ⚠ |
| 7 | ADOBE SYSTEMS INCORPORATED | 10-209-6559 | ▼76 | 400 | 1 ⚠ |
| 8 | COGNIZANT TECH SOLUTIONS CORP | 79-990-1301 | ▼74 | 400 | 1 ⚠ |
| 9 | KLEY, JAMES A COMPANY INC | 00-100-0553 | ▲80 | ▲99 | 14 ⚠ |
| 10 | PFIZER INC | 00-132-6495 | 70 | 98 | 1227 ⚠ |

[View All Companies] [Options]

NOTE: For the Branches above, the Financial Stress and Credit scores are for the Headquarter's location. Branch locations are not scored.

| Portfolio Risk Distribution by D&B PAYDEX | Portfolio Risk Distribution by Commercial Credit Score |
|---|---|
| The counts below reflect unique companies identified by D-U-N-S Number. They do not include instances where you have multiple accounts associated to a single company. | The counts below reflect unique companies identified by D-U-N-S Number. They do not include instances where you have multiple accounts associated to a single company. |
| HIGH: High Risk - average 30 to 120 days beyond terms | HIGH: High Risk |

MODULAR WEB-BASED ASP APPLICATION FOR MULTIPLE PRODUCTS

RELATED APPLICATIONS

This application claims priority to U.S. patent application Ser. No. 60/817,936 filed on Jun. 30, 2006; and U.S. patent application Ser. No. 60/723,854 filed Oct. 5, 2005.

BACKGROUND OF THE INVENTION

1. Field of the Invention

The present invention relates to systems for delivering business information and services, and more particularly, to systems for consolidating various business information products and services in a single platform.

2. Description of the Related Art

Conventional data integration systems typically update and verify data from numerous sources to be sure that business information data is accurate, complete, timely and globally accurate, so that customers can be confident in their critical business decisions.

The data integration systems incorporate processes that include collecting, aggregating, editing, and verifying data from thousands of sources daily so that customers can use the information to make profitable decisions for their businesses. An exemplary data integration system is described in co-pending U.S. patent application Ser. No. 10/368,072, filed on Feb. 18, 2003, the contents of which are incorporated by reference herein. Another example of a data integration system and process known as DUNSRight™, provided by the D&B Corporation. The foundation of such data integrations is quality assurance which includes thousands of separate automated checks, plus many manual ones, to ensure the data meets quality standards. In addition, five quality drivers work sequentially to collect and enhance the data, as shown in FIG. 1. Global Data Collection 1 brings together data from a variety of sources worldwide. Data is integrated into a Global Database 6 through Entity Matching 2, which produces a single, more accurate picture of each business. In step 3, a unique corporate identifier, such as a D-U-N-S® Number, is applied as a unique means of identifying and tracking a business globally through every step in the life and activity of the business. A Corporate Linkage step 4 enables customers to view their total risk or opportunity across related businesses. Lastly, Predictive Indicators 5 use statistical analysis to rate a business' past performance and to indicate how likely the business is to perform that same way in the future. Data Integration Information refers to data, including business information data, that has been subjected to at least one or more of the process steps described above.

Companies develop various risk management solutions to help customers increase profitability through effective risk management using business information collected and verified through the data integration process. Such solutions enable customers to improve cash flow by quickly identifying accounts likely to pay slowly or go bankrupt, manage total risk exposure by consolidating accounts receivable worldwide into a single database, boost operating margins by doing more with existing staff resources such as by automated decisioning solutions, establish decisioning that is compliant with all internal audit and external governance regulations, and increase revenue by quickly identifying low risk customers with credit remaining.

As shown in FIG. 2, customers have access to a variety of products and services, including risk management solutions, i.e., solutions, to optimize their use of business information. Customize marketing solutions (CMS) utilizes data integration information via a batch. Users can order various reports via links, such as ordering business information reports and alert services. Users can also access Toolkits, including a risk assessment manager (RAM, eRAM) and a global decision maker (GDM).

There exist current barriers for customers which prevent them from experiencing the full benefits of data integration available through existing solutions.

Such barriers include confusing product messaging, features, and benefits, overlapping capabilities, no logical or physical migration path between different solutions, disparate technology platforms that are difficult to upgrade and maintain, and data inconsistencies across different products. These barriers have limited the recognition and adoption of the highest value solutions and thereby have prevented customers from reaping the full benefits offered by these solutions.

There is a need for a system and method that allows use of various products and/or services on a single technology platform, that uses a subscription pricing model, can create services for specific customer segments, make products easy to understand and use, and allow unlimited, flexible access to real-time data.

SUMMARY OF THE INVENTION

There is provided a modular, preferably Web-based ASP (Application Service Provider) application that provides a single platform for a variety or plurality of products and services. Such products and services include risk management solutions, selected applications provided by a user, and various services.

DNBi is an interactive, customizable Web application that provides a user with the most complete and up-to-date DUNSRight™ information available, as well as comprehensive monitoring and portfolio analysis, all for one set price. DNBi empowers a user to make more informed, efficient, and insightful credit decisions by providing online access to the most complete and up-to-date information on over 100 million companies in the D&B global database.

DNBi offers two optional add-on modules: DNBi Decision Maker and DNBi Account Manager.

DNBi Decision Maker is a web-based, automated credit decisioning and workflow solution. It provides immediate, automated credit decisions and credit limits to credit professionals and sales team members based on a credit policy set by the user. DNBi Decision Maker has all the great features of DNBi, including access to the most complete, up-to-date DUNSRight™ information.

The Decision Maker generates immediate credit decisions on new applicants by applying the latest and most complete D&B information to a user's credit policies. Decision Maker will transforms the credit decision process by providing:

Decision Scorecards: Allows users to establish rules for evaluating credit applications based on the latest D&B business information. Decision Maker will automatically apply the rules to all new applicants.

Automated Credit Decisions: For new credit applicants, Decision Maker will generate an immediate decision and credit limit or escalate applications that require further review, bringing speed and consistency to the credit process.

Comprehensive Audit Trail: Leverage automatic, time-stamped documentation of critical events, ensuring that each decision is backed up and recorded throughout the credit decision process.

User Approval Limits: Assign each user an approval limit, and Decision Maker will automatically route applications to the proper team member for review.

DNBi Account Manager is an automated account management solution that reduces credit risk by identifying changes in account risk, recommending actions to take based on a user's credit policy, and focusing the credit professional's attention on accounts that need it the most. DNBi Account Manager has all the great features of DNBi, including access to the most complete, up-to-date DUNSRight™ information.

The Account Manager allows a user to manage the risk of the user's entire customer base by combining the user's credit policy, the user's Accounts Receivable data and the latest and most complete D&B information to tell the user when the user needs to take action on existing customers. Account Manager will transforms the customer review process by providing:

Decision Scorecards: Allows a user to establish customized rules for evaluating existing customers based on the latest D&B business information and on the user's Accounts Receivable.

Automatic Daily Account Reviews: Account Manager reviews each customer in the user's portfolio and notifies the user when a change in credit status should occur.

Centralized Electronic Credit File: View a complete picture of each customer's account aging, the latest D&B business information and all actions taken on the account.

Audit Trail: Every decision is recorded in Account Manager.

BRIEF DESCRIPTION OF THE DRAWINGS

FIG. 7 is a screenshot of a web page according to a web-based embodiment of the present invention.

FIG. 8 is a screenshot of another web page according to a web-based embodiment of the present invention.

Figure 11:
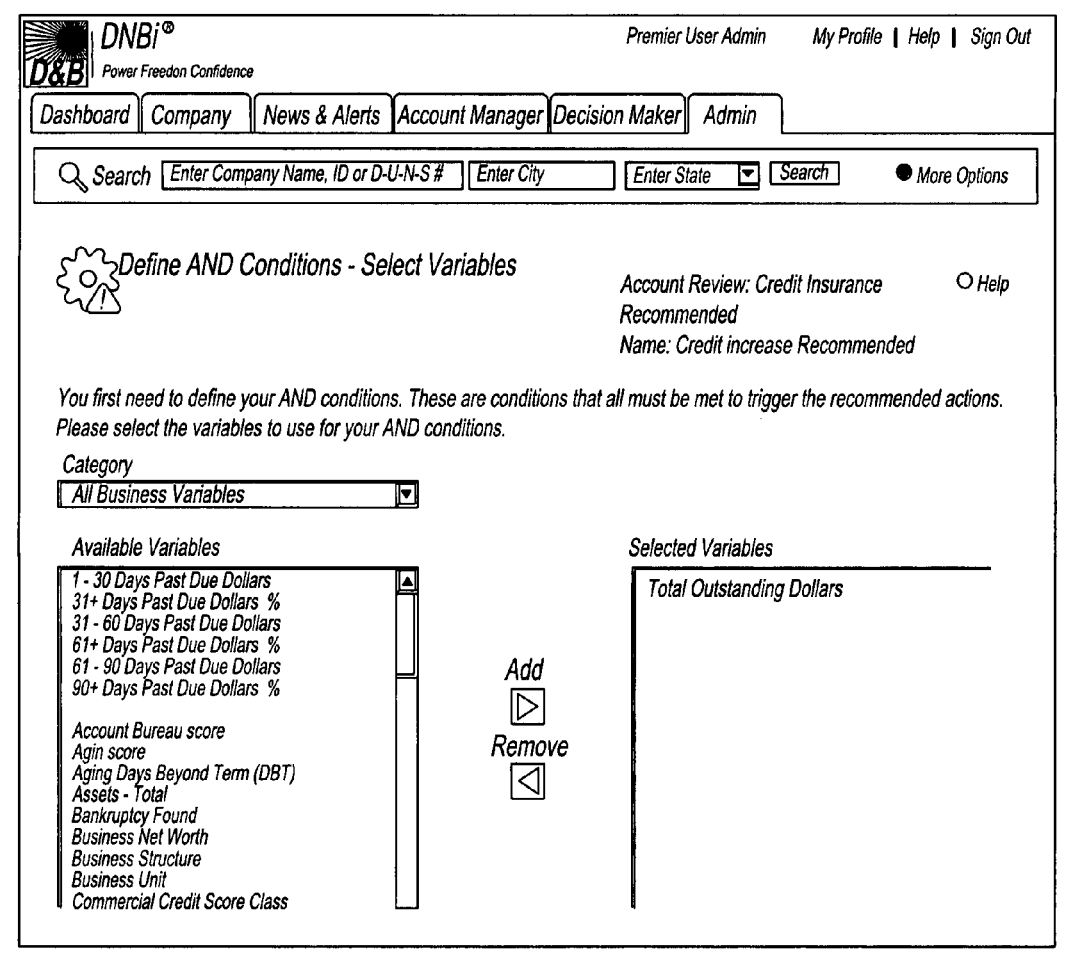

FIG. 11 is a screenshot of still another example of a web page according to a web-based embodiment of the present invention.

DESCRIPTION OF THE INVENTION

The present invention provides a modular, Web-based ASP (Application Service Provider) application that provides a single platform for a variety or plurality of products and services. The platform may be a web-based platform or any of a variety of software platforms such as those provided by a user.

The system preferably uses a subscription pricing model, to allow a user to access multiple solutions in a single platform by making a single periodic payment. Furthermore, the system can be built on a single Web-based technology platform.

Figure 1:
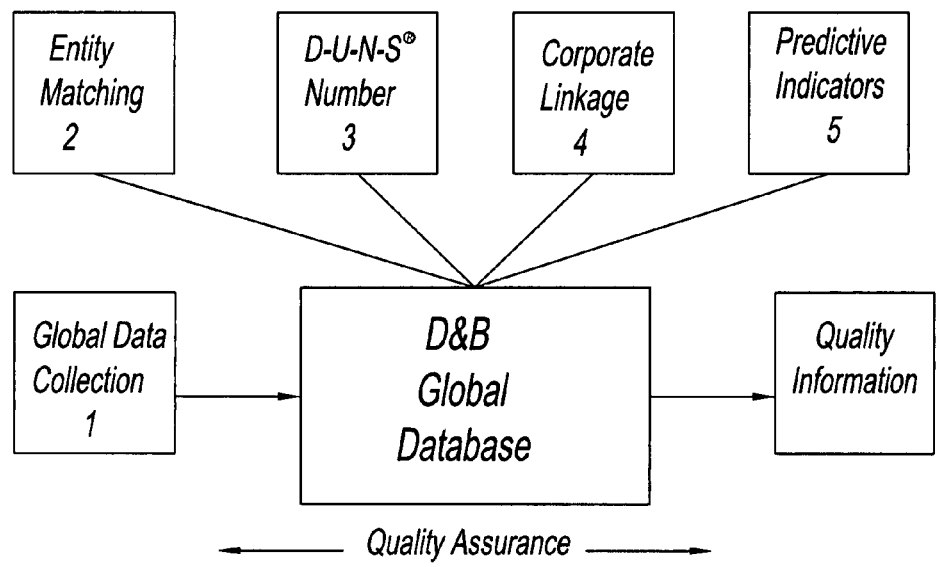
FIG. 1 is a representation of the data integration quality assurance process.
Figure 2:
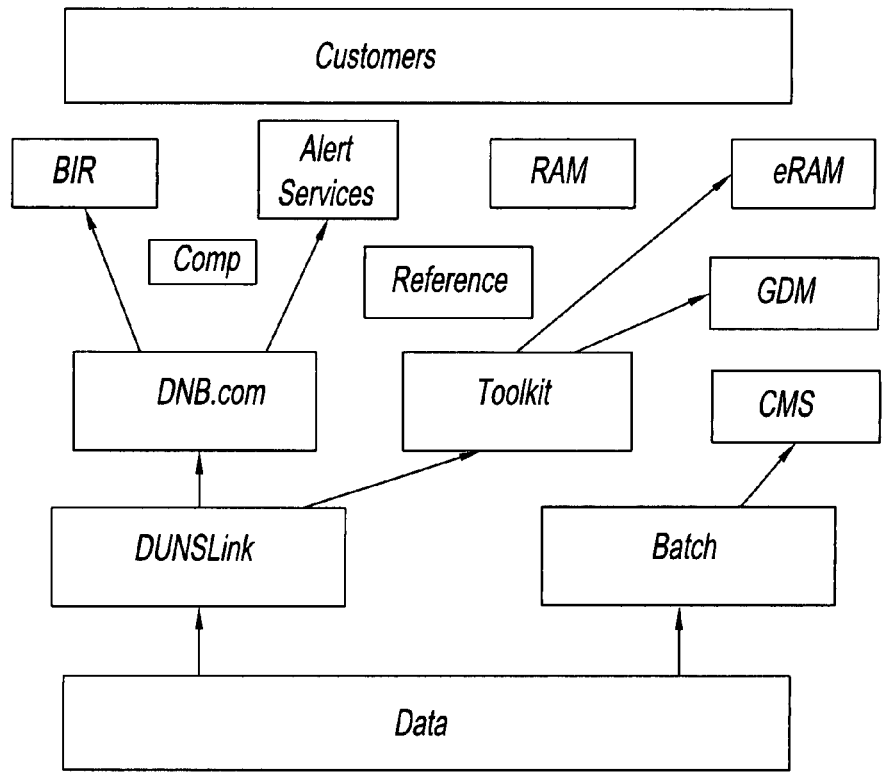
FIG. 2 is a block diagram of various solutions available to customers.
Figure 3:
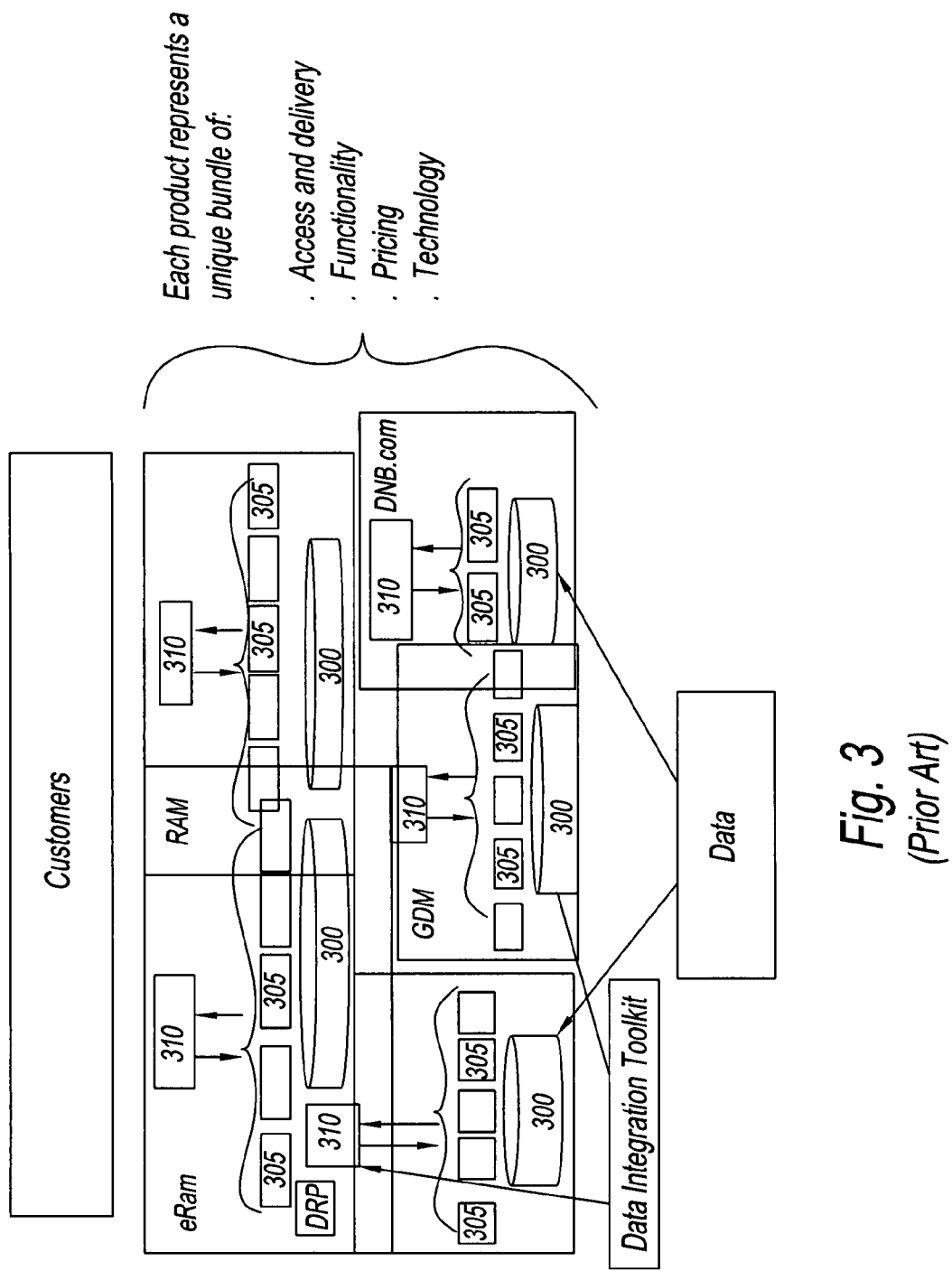
FIG. 3 is another block diagram of various solutions available to customers.

FIG. 3 demonstrates prior art delivery architecture, showing various solutions or products, such as eRAM and RAM (Risk Assessment Manager), DRP (DUNS Reference Plus), and GDM (Global Decision Maker). Each of these products represent a unique bundle of access and delivery, functionality, pricing and technology, presented to a customer on individual platforms. As shown in FIG. 3, each product includes a memory 300, services 305 and an application 310 corresponding to each solution.

Figure 4:
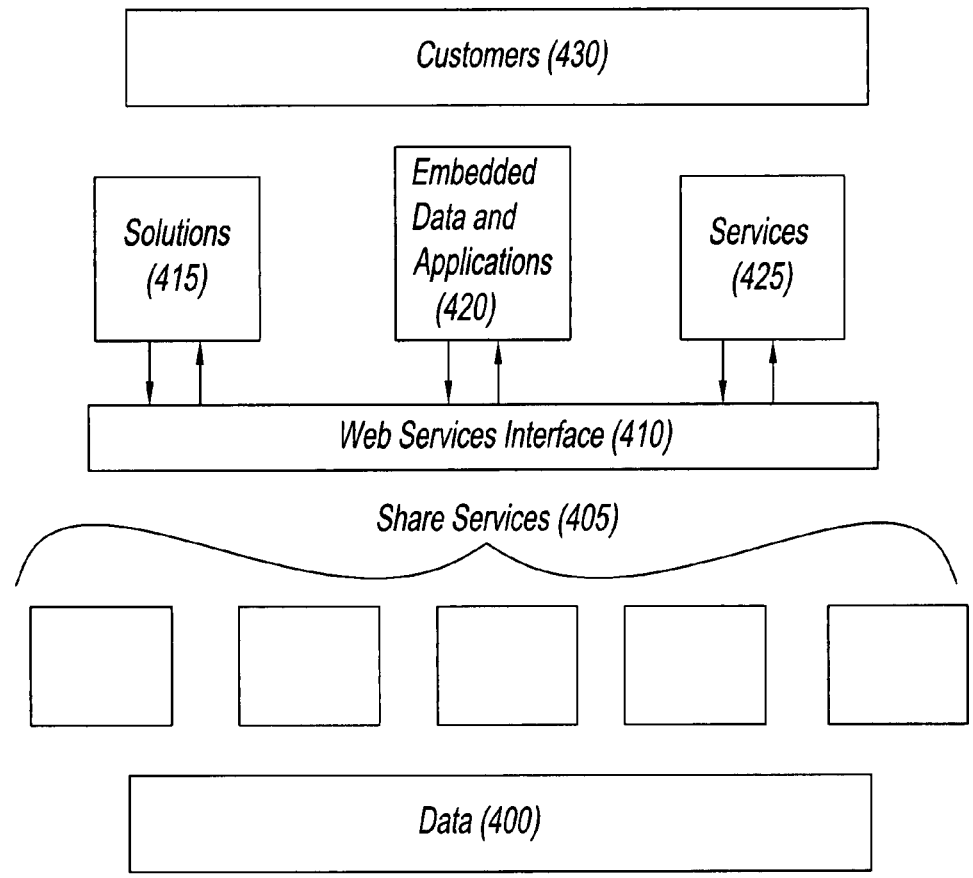
FIG. 4 is a block diagram of an embodiment of the system according to the present invention.

The present invention includes a simpler, more flexible architecture, generally represented in FIG. 4. As shown, data 400, including business information data, and data that was subject to the data integration processes described above, is input into various shared services 405 such as automated decisioning, which are all associated with a single interface 410, such as a web services interface. Via this interface, various solutions 415, such as web based applications, and embedded data and applications 420, as well as various services 425, can be delivered to a customer 430 through a single platform.

Solutions 415 represent a number of separate applications, such as various risk management solutions. In a preferred embodiment, solutions 415 are presented in a modular, web-based ASP application to provide a single platform for all applications, solutions and services. Embedded data and applications 420 represent data and applications, separate from solutions 415, which are delivered to customer 430 via interface 410.

Preferably, solutions 415 and applications 420 are delivered to customer 430 together via common interface 410. In another embodiment, interface 410 is preferably an XML-based web services interface which will allow customers to receive the value of DUNSRight functionality in addition to data within whatever applications 420 that customer 430 chooses. Applications 420 could include various accounting packages or CRM (Customer Relationship Management) applications Services 425 are also accessed by customer 430 via interface 410. Such services preferably include support services designed to aid customer 430 particularly to provide the expertise necessary to utilize solutions 415. Services 425 include outsourcing, advice and custom modeling.

The delivered product, including solutions 415, applications 420 and services 425 are all based on shared services 405, and are exposed via interface 410.

Thus, data 400 from, for example, a DUNSRight repository, is processed through various shared services, then delivered via a web services interface to customers either through ASP solutions, embedding in third party applications, or via professional services managed by a provider company's personnel.

Figure 5:
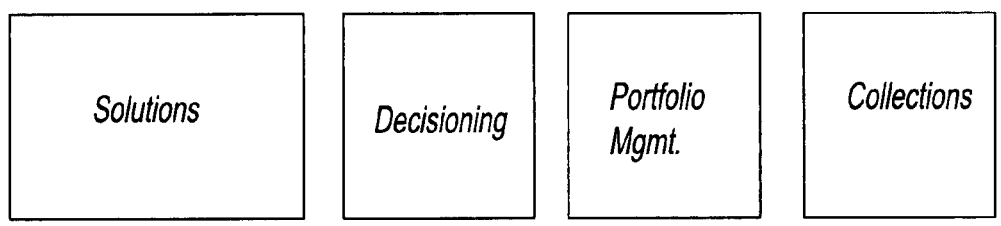
FIG. 5 is a block diagram demonstrating the modularity of an embodiment system of the present invention.
Figure 6:
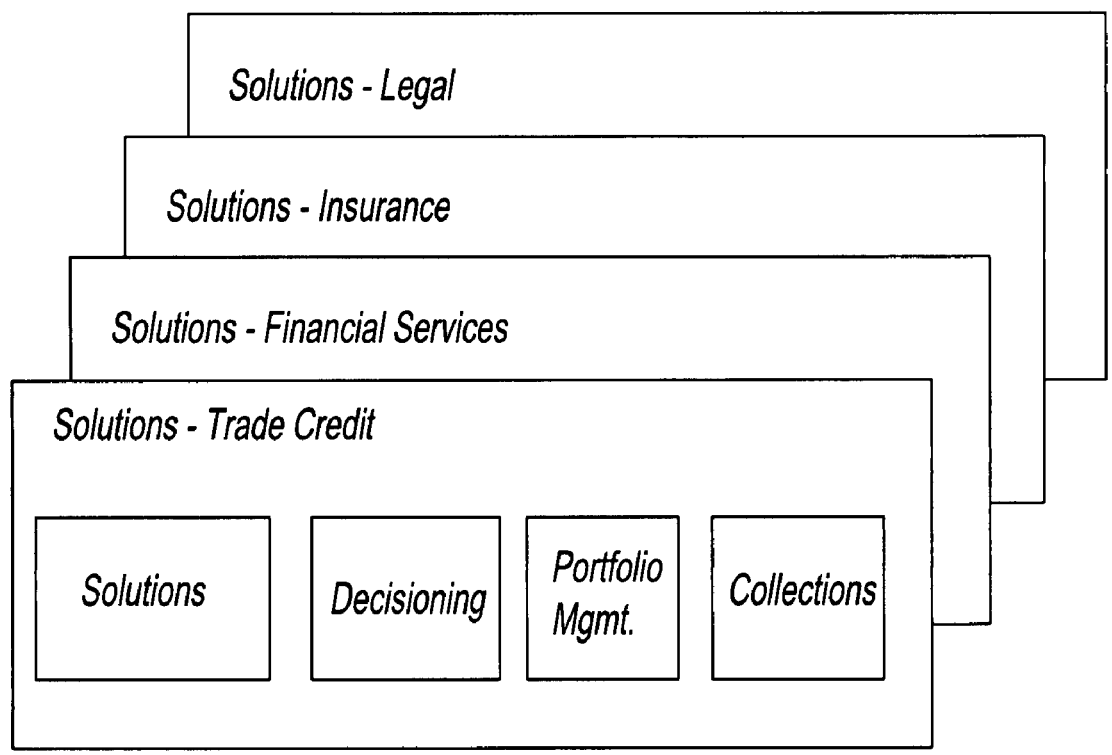
FIG. 6 is another block diagram demonstrating the modularity of an embodiment system of the present invention.

The solutions are shown in FIGS. 5 and 6, which demonstrate the modularity of the solutions platform. A "solutions bundle", shown in FIGS. 5 and 6, represents a customizable bundle of solutions. The solutions bundle may be modular, allowing customers to seamlessly add additional functionality as their needs expand. Such functionality may include additional decisioning solutions, portfolio management solutions, and collections solutions. Different versions of the solutions bundle, including different types of solutions, may be tailored to the needs of specific customer segments.

Examples include solutions bundle versions for trade credit, financial services, insurance, and legal.

In one embodiment, the solutions bundle is interactive. Such interactivity can enable customers to request financials from other businesses, leverage a standard universal credit application and provide access to businesses in order to capture data and generate leads. The interactivity would also encourage customers to upload trade data in order to receive analytics, enable customers to update their own data and provide feedback about other businesses, and provide the potential to create online trade groups enabling customers to communicate with one another in a controlled manner.

FIGS. 7-10 illustrate examples of screenshots taken from the modular web-based ASP application according to the present invention. In this embodiment, a customer can interact with the web-based platform shown in FIGS. 7-10, to access various kinds of business information for one or more entities. The application provides a single platform through which a customer can access various types of business reports, and various types of information on one or more companies. This service is preferably available for a subscription fee, allowing a customer access to all available data for a single fee.

Figure 8:
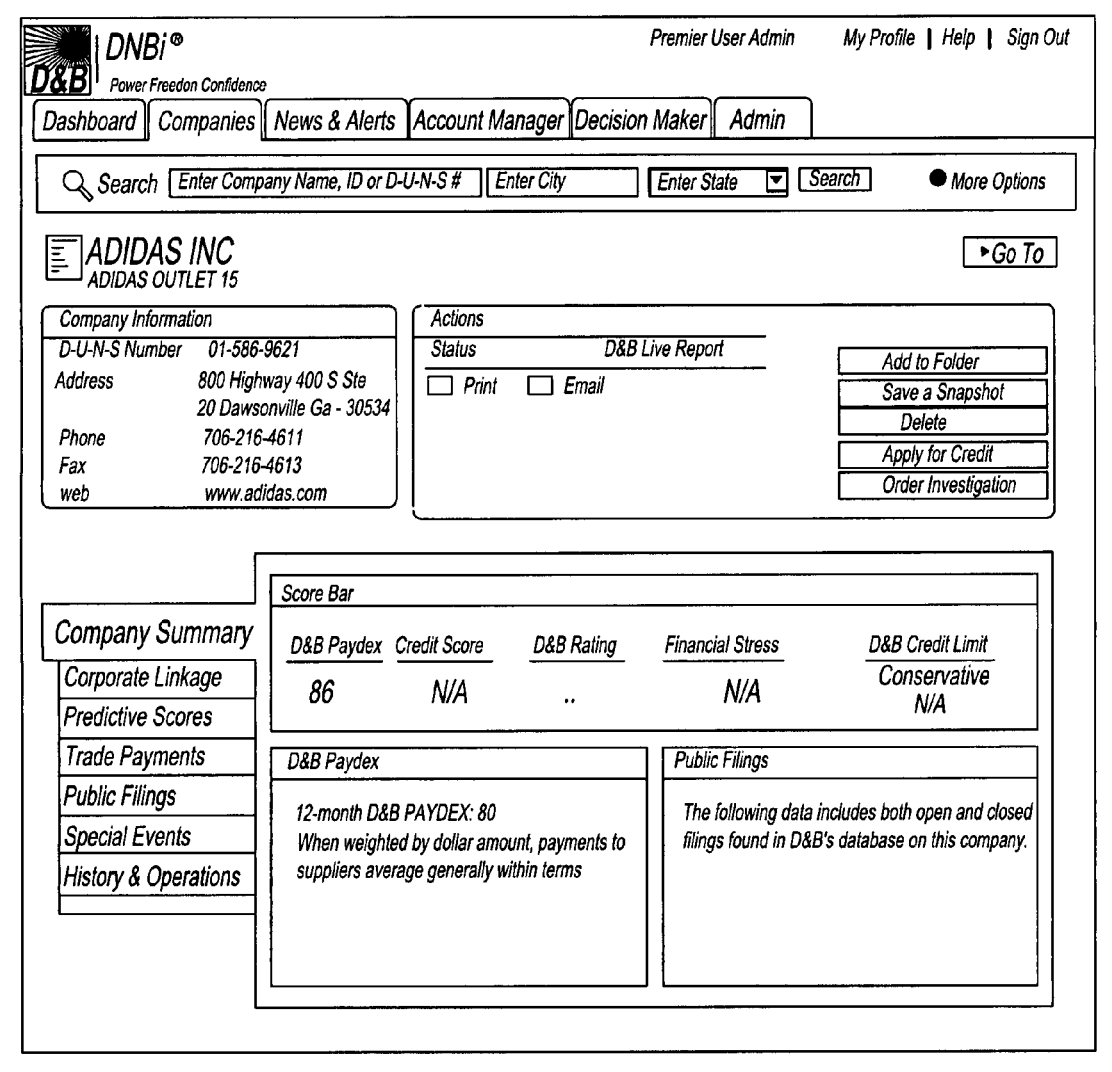
Figure 9:
FIG. 9 is a screenshot of yet another web page according to a web-based embodiment of the present invention.

FIG. 7 shows a summary of business information for selected entities. This information includes a listing of selected business entities, and information on each business entity such as its identifying DUNS number and a financial stress indicator. This summary may also includes information about a group of business entities, such as risk distribution information and risk trends for a group of entities, such as a particular industry. As shown in FIG. 8, a customer can access a summary of business information for a selected entity, that preferable includes additional information about that entity. FIG. 9 shows customization by the customer of the types of information to be displayed, and also customization as to how and where information is displayed in the company summary such as shown in FIG. 8.

Figure 10:
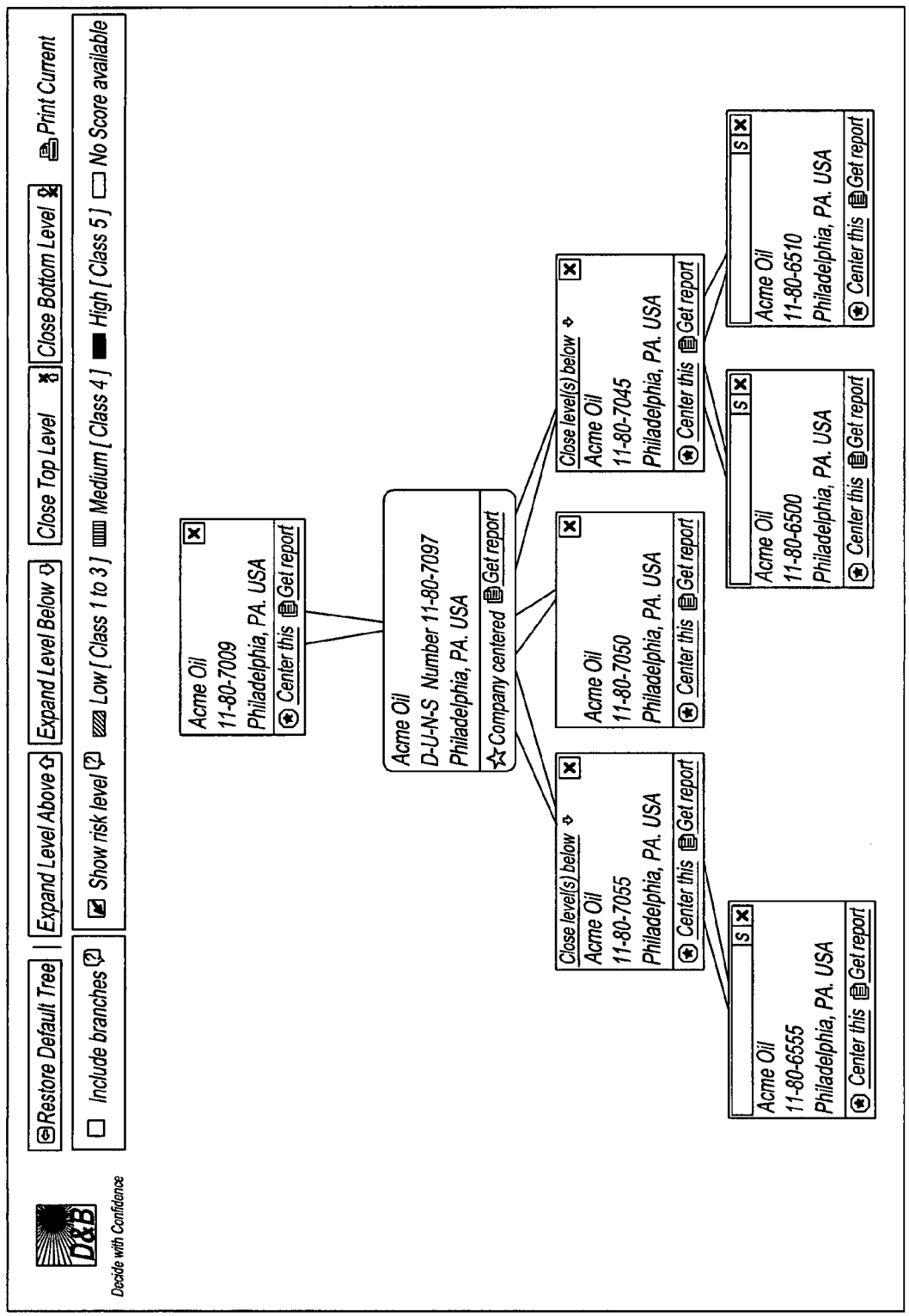
FIG. 10 is a screenshot of still another example of a web page according to a web-based embodiment of the present invention.

FIG. 10 shows an additional feature of the invention, in which a customer can access a "family tree" that provides a visual representation of various subsidiaries of an entity and/or various related entities. The various entity levels or branches illustrate the relationships between each entity. Each entity may also have a visual representation, such as a color, associated therewith, to signify a risk status or other status of an entity. For example, each entity shown in FIG. 10 may be colored green, yellow or red to signify a low credit risk, a medium credit risk, or a high credit risk, respectively.

Figure 12:
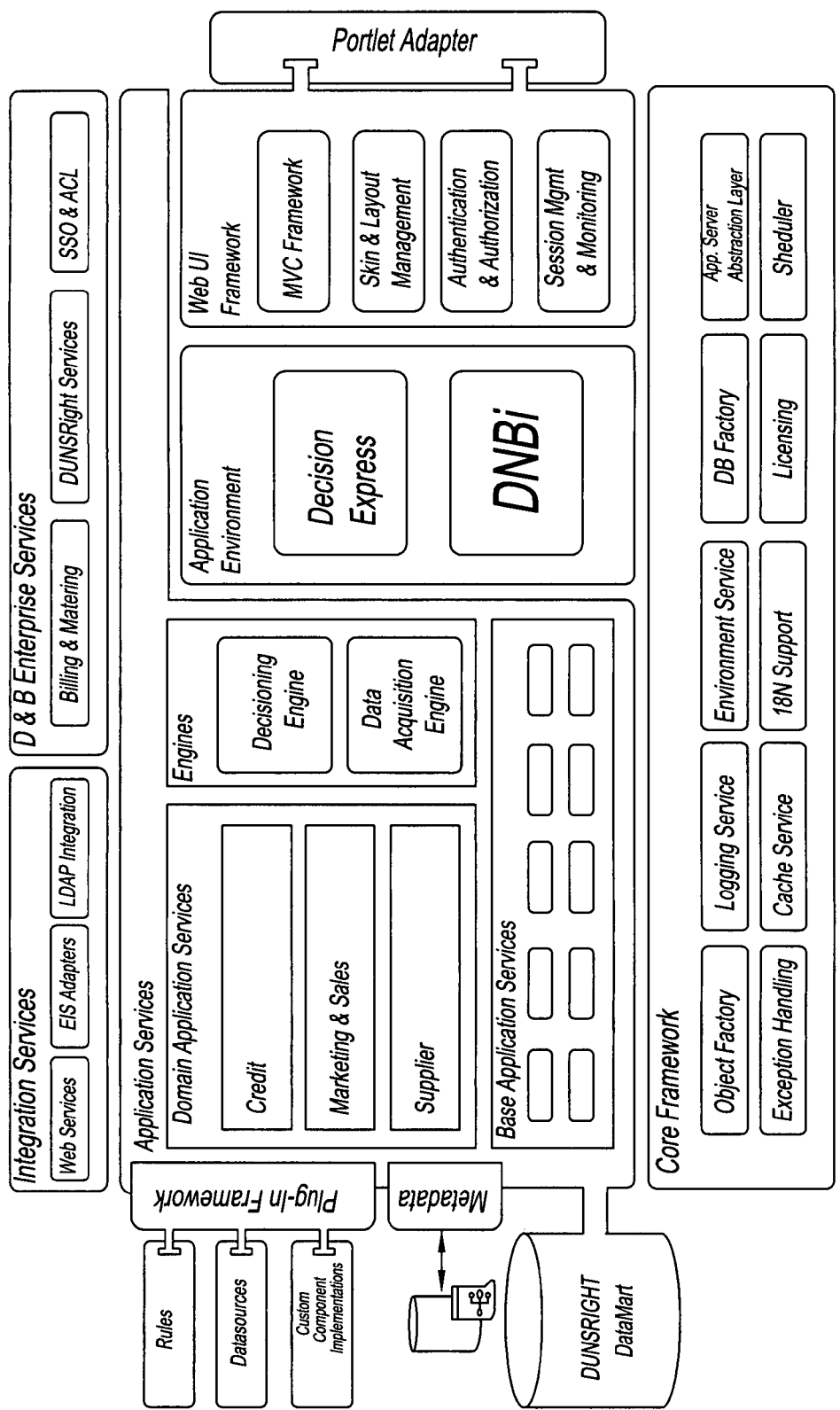
FIG. 12 is a representation of an embodiment of the system according to the present invention.

FIG. 12 shows a comprehensive and flexible application framework for delivering web-based applications. The framework is designed to support multiple application development efforts. The modularity of the framework allows for greater portability, allowing the applications that access the database to be platform independent. A user is therefore able to gain access to real time business data through the application environment.

In another embodiment, the system may also provide alerts to a customer, such as through email notifications, if certain there is a change in credit information or other information relating to a selected entity. For example, a customer can customize the system to provide an alert to the customer if a selected indicator increases or decreases to a selected value. Such indicators may include a payment performance indicator such as D&B's Paydex® indicator, or a financial stress indicator.

The system preferably uses a subscription pricing model, to allow a user to access multiple solutions in a single platform by making a single periodic payment. In one embodiment, the subscription pricing model is variable based on a user's previous use of available solutions before making or renewing a subscription. The price may be based on a user's use of solutions that were separately available in various platforms, or on the user's use of various solutions previously available in a single platform for a single fee. The system may make the subscription pricing calculation based on preselected criteria, such as the user's frequency of use of the solutions, the types of solutions used, and modeled opportunity of use in the future.

In one embodiment, data 400 relates to information on business entities. This information may relate to risk information such as credit risk, and other information such as en entity's structure, business performance, behavior and relationships with other business entities.

Advantages of the system of the present invention include allowing unlimited, flexible access to real-time data, and the ability to capture additional data from customers. The system allows for the rapid creation and deployment of additional solutions or services for selected specific customer segments. The system also allows for self-administration of the solution including easy-to-use configuration wizards that simplify the process of establishing automated credit policies and scorecards in the system.

It should be understood that various alternatives, combinations and modifications of the teachings described herein could be devised by those skilled in the art. The present invention is intended to embrace all such alternatives, modifications and variances that fall within the scope of the appended claims.

The invention claimed is:

1. A method of providing business information data to a user, the method comprising:
   presenting a user interface that provides functionality for a user to access and customize a first software application having a first functionality, and access and customize a second software application having a second functionality, for a presentation of business information data,
   wherein said first and second software applications interface with a database to obtain said business information data, and
   wherein said business information data relates to an entity and is based on a unique corporate identification number associated with said entity.

2. The method of claim 1, wherein said first software application provides company information, monitoring, and portfolio analysis.

3. The method of claim 1, wherein said first software application provides automated credit decisioning and workflow.

4. The method of claim 1, wherein said first software application provides automated account management.

5. The method of claim 1, wherein said first software application is a collections application.

6. The method of claim 1, wherein said user interface comprises an XML-based interface.

7. The method of claim 1, wherein said user interface comprises a web-based interface.

8. The method of claim 1, further comprising requiring a single subscription fee prior to allowing said user to access said first and second software applications.

9. The method of claim 8, wherein said subscription fee is determined based on criteria selected from the group consisting of: frequency of use, types of products used, modeled opportunity use in the future, and any combination thereof.

10. The method of claim 1, wherein said first software application is embedded in a third-party software application.

11. The method of claim 1, wherein said first software application is selected from the group consisting of: a credit application, a marketing application, a sales application, a supplier application, and any combination thereof.

12. The method of claim 1, wherein said user interface provides functionality for said user to access a service.

13. The method of claim 12, wherein said service is selected from the group consisting of: a support service, outsourcing, advice, custom modeling, and any combination thereof.

14. The method of claim 12, wherein said service is managed by a provider company.

15. The method of claim 1, wherein said user interface provides functionality for said user to request financials from other businesses, leverage a standard universal credit application and capture business data.

16. The method of claim 1, wherein said user interface provides functionality for said user to customize a type of business information data to be displayed, and how and where said business information data is displayed.

17. The method of claim 1, wherein said business information data comprises information selected from the group consisting of: an entity identifying number, a financial stress indicator, risk distribution information, risk trend information, and any combination thereof.

18. The method of claim 1, further comprising providing alerts to said user interface when said business information data changes, based on parameters set by said user.

19. The method of claim 1, wherein said business information data comprises a visual representation illustrating relationships between business entities.

20. The method of claim 19, wherein each of said business entities has a visual representation signifying a risk status thereof.

* * * * *